United States Patent
Lee

(10) Patent No.: US 12,047,936 B2
(45) Date of Patent: Jul. 23, 2024

(54) METHOD FOR TRANSMITTING/RECEIVING WIRELESS COMMUNICATION SIGNAL AND TERMINAL DEVICE FOR TRANSMITTING/RECEIVING WIRELESS COMMUNICATION SIGNAL

(71) Applicant: LG ELECTRONICS INC., Seoul (KR)

(72) Inventor: Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 17/427,851

(22) PCT Filed: Jun. 28, 2019

(86) PCT No.: PCT/KR2019/007888
§ 371 (c)(1),
(2) Date: Aug. 2, 2021

(87) PCT Pub. No.: WO2020/196989
PCT Pub. Date: Oct. 1, 2020

(65) Prior Publication Data
US 2022/0132523 A1 Apr. 28, 2022

(30) Foreign Application Priority Data
Mar. 26, 2019 (KR) .......... 10-2019-0034190

(51) Int. Cl.
*H04W 84/12* (2009.01)
*H04W 28/14* (2009.01)
(Continued)

(52) U.S. Cl.
CPC ....... *H04W 72/1215* (2013.01); *H04W 28/14* (2013.01); *H04W 4/80* (2018.02); *H04W 84/12* (2013.01); *H04W 88/06* (2013.01)

(58) Field of Classification Search
CPC ..... H04W 72/12; H04W 84/12; H04W 16/10; H04W 72/0446; H04W 84/20;
(Continued)

(56) References Cited

U.S. PATENT DOCUMENTS 9,826,529 B1 * 11/2017 Jorgovanovic .... H04W 72/0446
2006/0292987 A1   12/2006 Ophir et al.
(Continued)

FOREIGN PATENT DOCUMENTS

KR  10-2018-0064195 A  7/2018
KR  10-2018-0081289 A  7/2018

*Primary Examiner* — Tu X Nguyen
(74) *Attorney, Agent, or Firm* — Birch, Stewart, Kolasch & Birch, LLP

(57) ABSTRACT

A wireless communication terminal device according to embodiments of the present invention may comprise: a reception unit for receiving a first wireless communication signal including a first signal frame; an information processing unit for generating second duration information on the basis of first duration information contained in the first signal frame; and a transmission unit for transmitting a second wireless communication signal including a second signal frame containing the second duration information to an access point.

10 Claims, 10 Drawing Sheets

(51) Int. Cl.
*H04W 72/12* (2023.01)
*H04W 4/80* (2018.01)
*H04W 88/06* (2009.01)

(58) Field of Classification Search
CPC ..... H04W 76/28; H04W 16/14; H04W 12/47; H04W 76/15; H04W 56/00; H04W 72/04
See application file for complete search history.

(56) References Cited

U.S. PATENT DOCUMENTS

2012/0250532 A1   10/2012  Husted et al.
2017/0094677 A1    3/2017  Liu et al.
2018/0310301 A1* 10/2018  Amini ........................ H04L 1/18

* cited by examiner

Periodic channel creating step

Periodic channel terminating step

METHOD FOR TRANSMITTING/RECEIVING WIRELESS COMMUNICATION SIGNAL AND TERMINAL DEVICE FOR TRANSMITTING/RECEIVING WIRELESS COMMUNICATION SIGNAL

CROSS REFERENCE TO RELATED APPLICATIONS

This application is the National Stage filing under 35 U.S.C. 371 of International Application No. PCT/KR2019/007888, filed on Jun. 28, 2019, which claims the benefit of Korean Application No. 10-2019-0034190, filed on Mar. 26, 2019, the contents of all these applications being hereby incorporated by reference herein in their entirety.

TECHNICAL FIELD

The present disclosure relates to a wireless communication signal transceiving system, and more particularly, to a system capable of maximizing wireless communication efficiency by solving a wireless communication speed degradation problem, a data transmission loss problem and the like that may be caused on performing Bluetooth wireless communication and Wi-Fi wireless communication.

BACKGROUND ART

Recently, as interest and demand for smartphones and Internet of Things-based electronics have increased, more products are supporting Wi-Fi and Bluetooth at the same time. Bluetooth has the advantage of increasing data transfer rates because of its simple wireless connectivity and less sensitivity to obstacles. These products often share antennas for Wi-Fi and Bluetooth wireless communication, considering cost and compatibility (form factor) issues.

However, it is not possible to use Wi-Fi and Bluetooth wireless communications simultaneously using a single antenna. Additionally, if both Wi-Fi and Bluetooth are used together, it may cause a data loss problem or a reduced data transmission speed problem.

Therefore, to solve such problems, the present disclosure proposes a wireless communication user equipment and a wireless communication transceiving system, capable of solving a reduced data speed problem, a data loss problem and the like as well as enabling the coexistence of Bluetooth wireless communication and Wi-Fi wireless communication.

DETAILED DESCRIPTION OF DISCLOSURE

Technical Task

To solve the above problems, one technical task of the present disclosure is to improve a wire communication transmission speed and raising a success rate of data transmission by time-scheduling Bluetooth wireless communication and Wi-Fi wireless communication.

Another technical task of the present disclosure is to maximize efficiency in performing wireless communication with a Bluetooth device and an access point by a wireless communication user equipment and solve a data loss problem in a manner that the wireless communication user equipment transceives signaling information with the Bluetooth device and the access point. The technical task of the present disclosure is to prevent a data loss and improve a data transmission/reception speed in implementing such a real-time service as Voice over Wi-Fi (VoWiFi) and the like.

Technical Solutions

In one technical aspect of the present disclosure, provided is a wireless communication user equipment, including a receiving unit (110) receiving a first wireless communication signal containing a first signal frame, the first wireless communication signal including a wireless communication signal transmitted by a Bluetooth device, the first signal frame containing a first duration information, an information processing unit (130) generating a second duration information based on the first duration information, and a transmitting unit (120) transmitting a second wireless communication signal to an access point, wherein the second wireless communication signal may contain a second signal frame and wherein the second signal frame may contain the second duration information.

The second duration information may be obtained from subtracting a frame transmission time from the first duration information. The frame transmission time may include one of a first delay time, a second delay time and a sum of the first delay time and the second delay time, the first delay time may include a time taken from a time of transmitting the first wireless communication signal by the Bluetooth device to a time of receiving the first wireless communication signal by the wireless communication user equipment, and the second delay time may include a time taken from a time of transmitting the second wireless communication signal by the wireless communication user equipment to a time of receiving the second wireless communication signal by the access point.

The second duration information may be transmitted in a manner of being contained in a vendor specific frame contained in the second signal frame.

Based on receiving the second signal frame from the wireless communication user equipment, the access point may transmit transmission data to the wireless communication user equipment in a NAS (Notification of Awake State) duration section and the NAS duration section may include a section amounting to a time corresponding to the second duration information since a time of receiving the second signal frame by the access point. The transmission data may include a data generated within the NAS (Notification of Awake State) duration section and transmitted to the wireless communication user equipment or a data transmitted to the wireless communication user equipment after stored in a buffer memory included in the access point by being generated in a section other than the NAS duration section.

Advantageous Effects

A wireless User Equipment (UE) according to embodiments of the present disclosure may provide an effect that Bluetooth wireless communication and Wi-Fi wireless communication can coexist. A wireless communication UE according to embodiments of the present disclosure may provide an effect of data loss prevention and an effect of Wi-Fi transmission speed improvement. Particularly, a wireless communication UE according to embodiments of the present disclosure may provide an effect of solving a problem of data loss and a problem of wireless communication transmission speed reduction in case of using or interworking with such a real time service as VoWiFi.

A wireless communication UE according to embodiments of the present disclosure may solve a data lost problem by preventing a packet drop effect of Wi-Fi wireless communication that may occur in the course of performing wireless communication with a Bluetooth device. In addition, by preventing a packet drop of Wi-Fi wireless communication, a speed reduction problem of wireless communication can be solved from a link adaptation algorithm. Namely, a wireless communication UE according to embodiments of the present disclosure may perform continuous wireless communication without unnecessary protocol overhead. A wireless communication UE according to embodiments of the present disclosure may enable high-speed transmission/reception of wireless communication and provide an effect of raising wireless communication efficiency by maximizing wireless communication transmission available duration utilization. A wireless communication UE according to embodiments of the present disclosure may provide an effect of raising an occupation rate of Bluetooth-based wireless communication with a Bluetooth device according to embodiments of the present disclosure or Wi-Fi-based wireless communication with an access point according to embodiments of the present disclosure.

In the following, additional effects of the present disclosure will be described in detail with respect to embodiments.

DESCRIPTION OF DRAWINGS

The accompanying drawings illustrate embodiments of the invention and explain the principle of the present disclosure together with the description.

BEST MODE FOR DISCLOSURE

Figure 1:
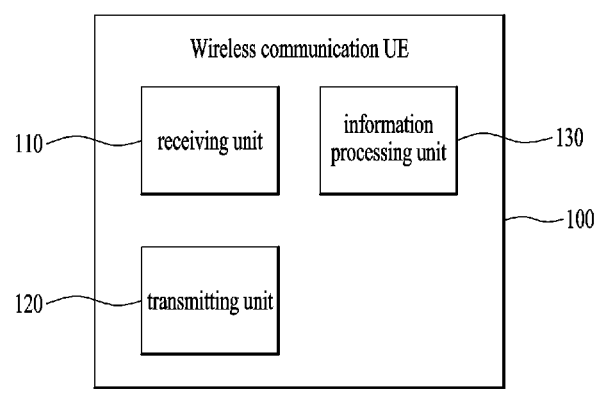
FIG. 1 is a block diagram showing a structure of a wireless communication UE according to embodiments of the present disclosure.

Preferred embodiments of the present disclosure are described in detail, examples of which are illustrated in the accompanying drawing. The detailed description below, referencing the accompanying drawings, is intended to illustrate the preferred embodiments of the present disclosure rather than to represent only those that can be implemented in accordance with the embodiments of the present disclosure. Hereinbelow, details are included to provide a thorough understanding of the present disclosure. However, it is apparent to those skilled in the art that the present disclosure can be implemented without such details. While most of the terms used in the present disclosure are chosen from the general ones widely used in the corresponding field, some terms are arbitrarily selected by the applicant and their meanings are described in detail as necessary in the following descriptions. Therefore, the present disclosure should be understood on the basis of the intended meaning of the term, not simply its name or meaning. Furthermore, the drawings and detailed descriptions below should be interpreted as containing equivalent or replaceable examples listed in the drawings and detailed descriptions of the present disclosure, rather than being interpreted only as specifically.

FIG. 1 is a block diagram showing a structure of a wireless communication UE according to embodiments of the present disclosure.

A wireless communication User Equipment (UE) 100 according to embodiments of the present disclosure may include a receiving unit 110 receiving a wireless communication signal, an information processing unit 130 generating information to transmit based on the wireless communication signal received from the receiving unit, and a transmitting unit 120 modulating the information generated from the information processing unit into a wireless communication signal and then transmitting the wireless communication signal.

The receiving unit 110 of the wireless communication UE 100 according to embodiments of the present disclosure may receive a wireless communication signal. The wireless communication signal may include a wireless communication signal transmitted from a Bluetooth device, a wireless communication signal transmitted from an access point, or one of wireless communication signals transmitted from other devices. The receiving unit 110 may transmit the received wireless communication signal to the information processing unit 130.

The information processing unit 130 may receive the wireless communication signal from the receiving unit 110 and use or process information included in the wireless communication signal.

The transmitting unit 120 may receive information generated by the information processing unit 130, modulates it into a wireless communication signal, and then transmit the wireless communication signal. The wireless communication signal may include a Bluetooth or Wi-Fi based wireless communication signal. A destination of the wireless communication signal may be a Bluetooth device 210 or an access point 220 according to embodiments of the present disclosure in the following.

Figure 2:
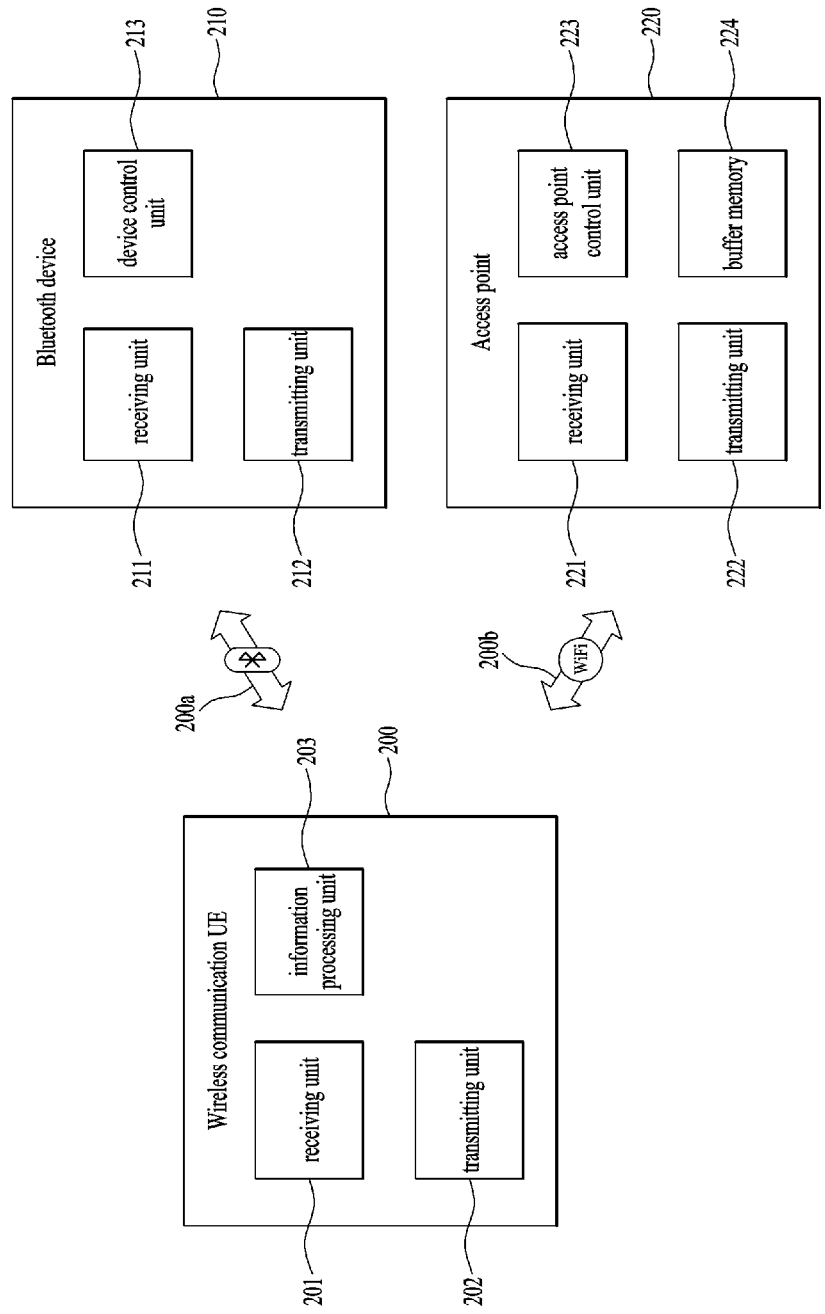
FIG. 2 is a block diagram showing a method for a wireless communication UE 200 according to embodiments of the present disclosure to transceive wireless communication signals with a Bluetooth device 210 and an access point 220 according to embodiments of the present disclosure.

FIG. 2 is a block diagram showing a method for a wireless communication UE 200 according to embodiments of the present disclosure to transceive wireless communication signals with a Bluetooth device 210 and an access point 220 according to embodiments of the present disclosure.

A wireless communication UE 200, a receiving unit 201, a transmitting unit 202 and an information processing unit 203 according to embodiments of the present disclosure may correspond to the wireless communication UE 100, the receiving unit 110, the information processing unit 130 and the transmitting unit 120.

A Bluetooth device 210 according to embodiments of the present disclosure may include a receiving unit 21, a device control unit 213 and a transmitting unit 212. The receiving unit 211 of the Bluetooth device 210 according to embodiments of the present disclosure may receive a Bluetooth-based wireless communication signal. The Bluetooth-based wireless communication signal may be transmitted from a wireless communication UE according to embodiments of the present disclosure.

The device control unit 213 of the Bluetooth device 210 according to embodiments of the present disclosure may receive a wireless communication signal from the receiving unit 211 and then use information included in the wireless communication signal.

The transmitting unit 212 may receive information generated by the information processing unit 213, modulate it into a wireless communication signal, and then transmit the wireless communication signal. A destination device of the wireless communication signal may include the wireless communication UE 200 according to embodiments of the present disclosure.

An access point 220 according to embodiments of the present disclosure may include a receiving unit 221, an access point control unit 223, a buffer memory 224 and a transmitting unit 222. The receiving unit 221 of the access point 220 according to embodiments of the present disclosure may receive a Wi-Fi based wireless communication signal. The Wi-Fi based wireless communication signal may be transmitted from the wireless communication UE 200 according to embodiments of the present disclosure. The access point control unit 223 of the access point 220 according to embodiments of the present disclosure may receive a wireless communication signal from the receiving unit and use, process or generate data included in the received wireless communication signal. In the course of processing or using the data, the access point control unit 223 may save all or some of the data to the buffer memory 224 in the following. The buffer memory 224 of the access point 220 according to embodiments of the present disclosure may store data that will be processed by the access point control unit 223.

The transmitting unit 222 may receive the data generated or processed by the access point control unit 223 from the access point control unit 223, modulate it into a wireless communication signal, and then transmit the wireless communication signal. The wireless communication signal may include a Wi-Fi based wireless communication signal.

The wireless communication UE 200 according to embodiments of the present disclosure may transceive a Bluetooth based wireless communication signal with the Bluetooth device 210 [200a]. The wireless communication UE 200 and the Bluetooth device 210 according to embodiments of the present disclosure may transceive data based on eSCO/SCO (Synchronous connection-oriented/Enhanced connection-oriented) protocol or Asynchronous Connection-Less (ACL). The wireless communication UE 200 according to embodiments of the present disclosure may transceive a Wi-Fi based wireless communication signal with the access point 220 [200b].

Figure 3:
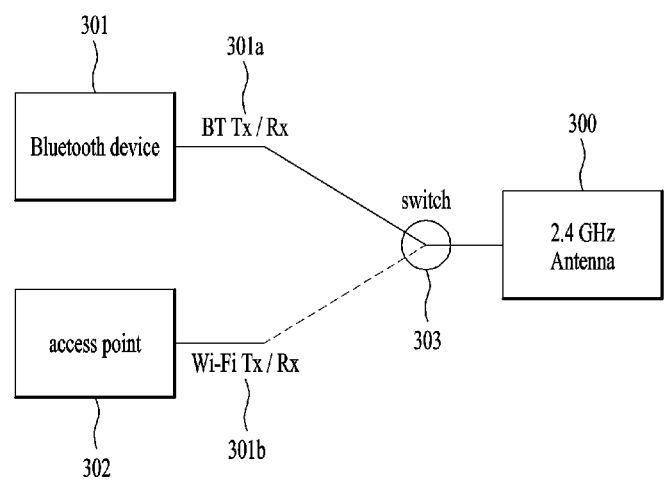
FIG. 3 is a block diagram showing a transmitting unit 300 of a wireless communication UE that performs transmission/reception with an access point 302 and a Bluetooth device 301 by sharing a single antenna 300.

FIG. 3 is a block diagram showing a transmitting unit 300 of a wireless communication UE that performs transmission/reception with an access point 302 and a Bluetooth device 301 by sharing a single antenna 300.

In the present drawing, a Bluetooth device 301 may correspond to the Bluetooth device 201 according to embodiments of the present disclosure shown in FIG. 2. In the present drawing, an access point 302 may correspond to the access point 220 according to embodiments of the present disclosure shown in FIG. 2. In the present drawing, a BT Tx/Rx 301a and a Wi-Fi Tx/Rx 301b may correspond to the Bluetooth based wireless communication 200a and the Wi-Fi based wireless communication 200b described and shown in FIG. 2, respectively.

A transmitting unit 300 of a wireless communication UE may include a single antenna. The wireless communication UE may perform Bluetooth based wireless communication [301a] or Wi-Fi based wireless communication on a 2.4 GHz band by sharing a single antenna [301b]. Since the Bluetooth based wireless communication and the Wi-Fi based wireless communication are performed on the same band, it is necessary to appropriately schedule both communications at the single antenna 300.

For one example of scheduling both wireless communications, an arbiter 303 or a switch 303 may be included in the antenna 300. Using the arbiter or switch 303 included in the antenna 300, data to be transmitted as a wireless communication signal may be transmitted in a manner of being time-scheduled. An arbiter or switch included in a transmitting unit of a wireless communication UE may alternately perform Bluetooth based wireless communication and Wi-Fi based wireless communication by predetermined time periods in a manner of performing the time-scheduling. 'Performing alternately' may mean that a wireless communication UE performs Bluetooth based wireless communication for a first period based on time-scheduling and then performs Wi-Fi based wireless communication for a second period based on time-scheduling after the first period. By performing time-scheduling, it is able to reduce the data loss and transmission speed reduction problems due to Bluetooth based wireless communication and Wi-Fi based wireless communication.

For another example of scheduling both wireless communications, there may be signaling using a power service enable bit and a power service disable bit. First of all, the wireless communication UE 300 according to embodiments of the present disclosure is assumed as performing Wi-Fi based wireless communication with the access point 302. Prior to performing Bluetooth based wireless communication with the Bluetooth device 301 according to embodiments of the present disclosure, the wireless communication UE 300 transmits a power service enable bit to the access point 302. Having received the power service enable bit, the access point 302 stops the Wi-Fi based wireless communication with the wireless communication UE according to embodiments of the present disclosure. If the wireless communication UE 300 performs and then terminates the wireless communication with the Bluetooth device 301, the wireless communication UE 300 transmits a power service disable bit to the access point 302. Having received the power service disable bit, the access point 302 performs the Wi-Fi based wireless communication with the wireless communication UE according to embodiments of the present disclosure again. Using the power service enable bit and the power service disable bit, the wireless communication UE according to embodiments of the present disclosure may perform wireless communications with the Bluetooth device 301 and the access point 302 efficiently.

Figure 4:
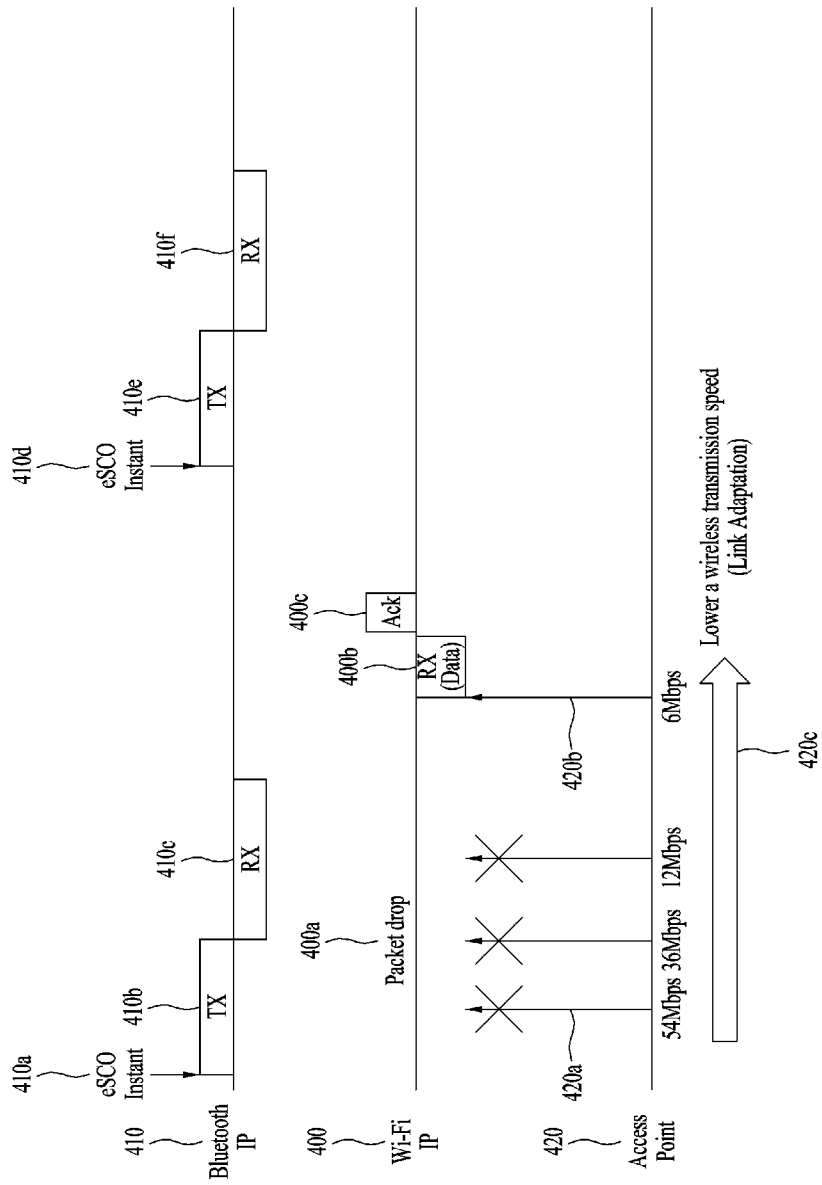
FIG. 4 is a flowchart showing a method for a wireless communication UE 400 to transceive wireless communication signals with a Bluetooth device 410 and an access point 420.

FIG. 4 is a flowchart showing a method for a wireless communication UE 400 to transceive wireless communication signals with a Bluetooth device 410 and an access point 420.

A wireless communication UE 400, a Bluetooth device 410 and an access point 420 according to embodiments of the present disclosure described with reference to the present drawing may correspond to the wireless communication UE 200, the Bluetooth device 210 and the access point 220 described with reference to FIG. 2.

The wireless communication UE 400 may transceive wireless communication signals with the Bluetooth device 410 and the access point 420 in the following manner. First of all, the Bluetooth device 410 and the wireless communication UE 400 may create a periodic channel eSCO/SCO for bi-directional wireless communication [410a, 410d]. The periodic channel for the b-directional wireless communication may mean a channel for periodic and synchronous transmission/reception for such services as voice and music by the Bluetooth device 410. Once the periodic channel for the bi-directional wireless communication is created, the Bluetooth device 410 and the wireless communication UE exchange data with each other [410b, 410c, 410e, 410f]. The process for the wireless communication UE 400 and the Bluetooth device 410 according to embodiments of the present disclosure to perform the Bluetooth based wireless communication may correspond to the wireless communication performing process 200a between the wireless communication UE 200 and the Bluetooth device 210 described in FIG. 2.

Simultaneously, the access point 420 is assumed as transmitting data to the wireless communication UE [420a]. In this case, since the wireless communication UE 400 is performing the wireless communication with the Bluetooth device 410, a wireless communication signal transmitted by the access point 420 is packet-dropped [400a]. Once the transmitted wireless communication signal is dropped, the access point retransmits a wireless communication signal and the retransmitted wireless communication signal is successfully transmitted to the wireless communication UE [400b, 420b]. Once the wireless communication signal is successfully transmitted to the wireless communication UE, the wireless communication UE transmits an acknowledgement message [400c]. The process for the wireless communication UE 400 and the access point 420 according to embodiments of the present disclosure to perform the Wi-Fi based wireless communication may correspond to the wireless communication performing process 200b between the wireless communication UE 200 and the access point 220 described in FIG. 2.

If the wireless communication signal transmitted form the access point is packet-dropped, the access point lowers a wireless transmission speed by delaying a transmission period of the wireless communication signal [420c]. Such an operation of delaying a transmission period of a wireless communication signal may be referred to as 'link adaptation'. An object of the link adaptation is to increase system reception capacity and frequency efficiency by controlling a wireless communication speed in a poor situation of a wireless communication environment.

While the wireless communication UE 400 creates a periodic Tx/Rx channel with the Bluetooth device 410 and performs wireless communication, as the access point 420 transmits a wireless communication signal to the wireless communication UE 400, if the wireless communication signal is packet-dropped, the link adaptation may be applied to lower a wireless communication transmission speed. Therefore, the present disclosure proposes a wireless communication transceiving method that avoids lowering a wireless transmission speed due to link adaptation.

Figure 5:
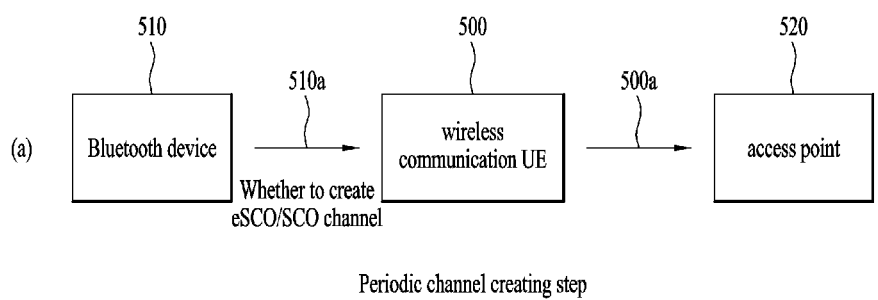
FIG. 5 is a block diagram showing a process for generating/terminating a periodic channel in order for a wireless communication UE 500 according to embodiments of the present disclosure to transceive data with a Bluetooth device 510 and an access point 520 according to embodiments of the present disclosure.
Figure 5:
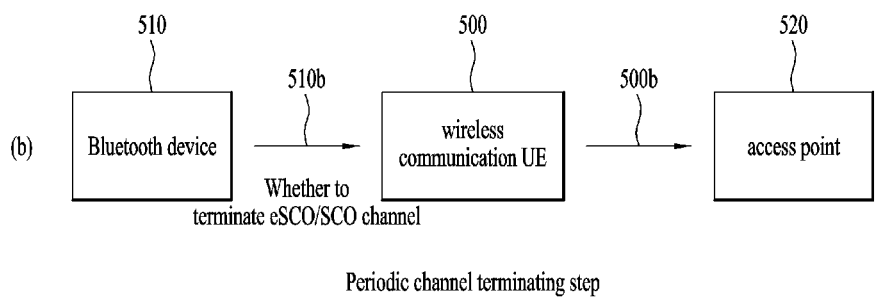

FIG. 5 is a block diagram showing a process for generating/terminating a periodic channel in order for a wireless communication UE 500 according to embodiments of the present disclosure to transceive data with a Bluetooth device 510 and an access point 520 according to embodiments of the present disclosure.

FIG. 5 (a) is a block diagram showing a step of creating a periodic channel of the Bluetooth device 510 and the wireless communication UE 500 before the wireless communication UE 500 according to embodiments of the present disclosure transceive data with the Bluetooth device 510 and the access point 520 according to embodiments of the present disclosure.

First of all, a transmitting unit of the Bluetooth device 510 may transmit a signal indicating whether to create a periodic Transmission/Reception (Tx/Rx) required channel to the wireless communication UE 500 [510a]. As one example of the periodic transmission/reception required channel, there is eSCO/SCO. If the wireless communication UE 500 receives the signal indicating whether to create the channel, the wireless communication UE 500 creates a periodic Tx/Rx channel with the Bluetooth device 510. If the wireless communication UE 500 creates the periodic Tx/Rx channel, it sets power management and then transmits it to the access point 520 [500a].

FIG. 5 (b) is a block diagram showing a step of terminating the periodic channel of the Bluetooth device 510 and the wireless communication UE 500 after the wireless communication UE 500 according to embodiments of the present disclosure has transceived the data with the Bluetooth device 510 and the access point 520 according to embodiments of the present disclosure.

First of all, the transmitting unit of the Bluetooth device 510 may transmit a signal indicating whether to terminate the periodic transmission/reception required channel to the wireless communication UE 500 [510b]. If the wireless communication UE 500 receives the signal indicating whether to terminate the channel, the wireless communication UE 500 terminates the periodic channel with the Bluetooth device 510. If the wireless communication UE 500 terminates the periodic transmission/reception required channel, it clears a power management bit and then transmits it to the access point 520 [500b].

Figure 6:
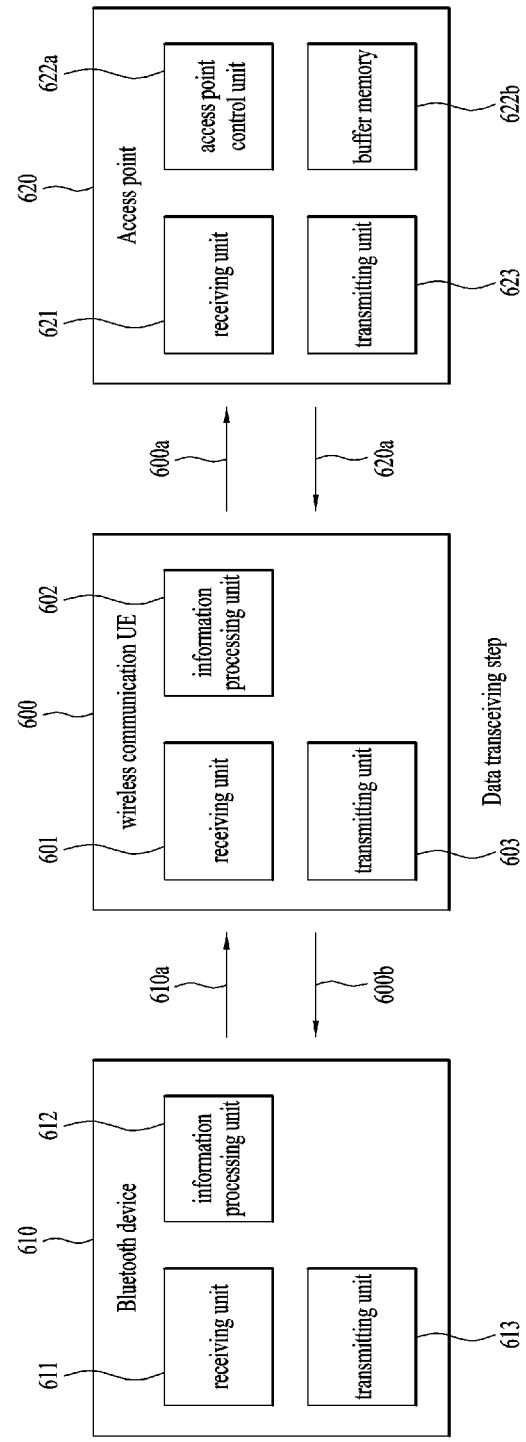
FIG. 6 is a block diagram showing a method for a wireless communication UE 600 according to embodiments of the present disclosure to transceive wireless communication signals with a Bluetooth device 610 and an access point 620 according to embodiments of the present disclosure.

FIG. 6 is a block diagram showing a method for a wireless communication UE 600 according to embodiments of the present disclosure to transceive wireless communication signals with a Bluetooth device 610 and an access point 620 according to embodiments of the present disclosure.

A wireless communication UE 600, a Bluetooth device 610 and an access point 620 according to embodiments of the present disclosure described in the present drawing may correspond to the wireless communication UE 200, the Bluetooth device 210 and the access point 220 described with reference to FIG. 2. A receiving unit 601, an information processing unit 602 and a transmitting unit 603 of the wireless communication UE 600 may correspond to the receiving unit 201, the information processing unit 203 and the transmitting unit 202 of the wireless communication UE described with reference to FIG. 2, respectively. A receiving unit 611, a device control unit 612 and a transmitting unit 613 of the Bluetooth device 610 may correspond to the receiving unit 211, the device control unit 213 and the transmitting unit 212 of the Bluetooth device 210 described with reference to FIG. 2, respectively. A receiving unit 621, an access point control unit 622a, a buffer memory 622b and a transmitting unit 623 of the access point 620 may correspond to the receiving unit 221, the access point control unit 223, the buffer memory 224 and the transmitting unit 222 of the access point 220 described with reference to FIG. 2, respectively.

A method for a wireless communication UE 600 according to embodiments of the present disclosure to perform wireless communication with a Bluetooth device 610 or an access point 620 according to embodiments of the present disclosure may be described as repetitive execution of the two steps described hereinbelow. A first step includes the step of performing wireless communication with the Bluetooth device 610 by the wireless communication UE 600, and a second step includes the step of performing wireless communication with the access point 620 by the wireless communication UE 600.

The first step, i.e., the step of performing wireless communication with the Bluetooth device 610 by the wireless communication UE 600 will be described as follows. The wireless communication UE 600 and the Bluetooth device 610 according to embodiments of the present disclosure may perform wireless communication through a periodic Tx/Rx channel until a specific time expires from a time of initiating Bluetooth based wireless communication [610a, 600b]. In doing so, the device control unit may determine the specific time by statistical calculation or the specific time may be determined as a predetermined value by a user. The specific time may be referred to as 'Bluetooth wireless communication available time', and a section of the Bluetooth wireless communication available time may be referred to as 'Bluetooth wireless communication section'.

If the Bluetooth wireless communication available time expires from the time of performing the wireless communication with the wireless communication UE 600, the Bluetooth device 610 according to embodiments of the present disclosure may transmit a wireless communication signal containing a first signal frame to the wireless communication UE 600 according to embodiments of the present disclosure [610a]. The wireless communication signal containing the first signal frame may be referred to as a first wireless communication signal. The first signal frame may mean a unit of a wireless communication signal. The first signal frame may include a first duration information.

The first duration information is the information indicating a time for which the Bluetooth device 610 according to embodiments of the present disclosure do not perform Bluetooth based wireless communication with the wireless communication UE 600 according to embodiments of the present disclosure. Namely, the time for not performing the wireless communication may mean a section amounting to a time indicated by the first duration information since a time that the transmitting unit 603 of the Bluetooth device 610 has transmitted the first wireless communication signal.

The first duration information may be calculated by the device control unit 612 of the Bluetooth device or directly set by a user of the Bluetooth device 610. The first duration information may be determined as follows. The first duration information may mean a time taken until the Bluetooth wireless communication becomes available again since the expiration of a time for which the Bluetooth device 610 is capable of the Bluetooth wireless communication. In addition, the first duration information may mean a time taken until ACL based wireless communication is performed since the expiration of a time for which Bluetooth based wireless communication is available. The first duration information may be represented in unit of time, and more preferably, as an integer in microsecond unit.

Namely, the Bluetooth device 610 according to embodiments of the present disclosure may perform wireless communication with the wireless communication UE 600 within the Bluetooth wireless communication duration. If the Bluetooth wireless communication available time expires, the Bluetooth device 610 transmits the first wireless communication signal to the wireless communication UE 600 and does not perform the wireless communication with the wireless communication UE 600 for a time amounting to the time corresponding to the first duration information since the time of transmitting the first wireless communication signal.

The second step, i.e., the step of performing wireless communication with the access point 620 by the wireless communication UE 600 will be described as follows. The receiving unit 601 of the wireless communication UE 600 according to embodiments of the present disclosure may receive the first wireless communication signal transmitted formerly by the Bluetooth device 610 [610a]. The receiving unit 601 may transmit the received first wireless communication signal to the information processing unit 602. The information processing unit 602 may obtain the first duration information contained in the first signal frame by parsing the first signal frame contained in the first wireless communication signal received from the receiving unit 601. Based on the obtained first duration information, the information processing unit 602 may generate a second duration information. The information processing unit 602 transmits the generated second duration information to the transmitting unit 603. The transmitting unit 603 may generate a second signal frame containing the second duration information, demodulate the second signal frame into a second wireless communication signal, and then transmit it to the access point 620 [600a]. In this case, the second signal fame may be referred to as 'Notification of Awake State (NAS) frame'.

The second duration information may be a time information indicating a time for which a wireless communication UE according to embodiments of the present disclosure can perform Wi-Fi based wireless communication with an access point according to embodiments of the present disclosure. In this case, a section of a time for which the wireless communication UE 600 can perform Wi-Fi based wireless communication may be referred to as 'Wi-Fi wireless communication section'. Namely, the wireless communication UE 600 may perform wireless communication with the access point 620 in a section corresponding to a time corresponding to the second duration information since a time of receiving the second wireless communication signal by the access point 620, i.e., the Wi-Fi wireless communication section.

Particularly, the receiving unit 621 of the access point 620 according to embodiments of the present disclosure may receive the second wireless communication signal [600a]. The receiving unit 621 may transmit the received second wireless communication signal to the access point control unit 622a. The access point control unit 622a may obtain the second duration information contained in the second signal frame by parsing the second signal frame contained in the wireless communication signal transmitted from the receiving unit 621. Based on the obtained second duration information, the information processing unit 602 may calculate a data transmission available time of the access point 620.

Here, the data transmission available time of the access point 620 may be a time amounting to a time corresponding to the second duration information since a time of receiving the second wireless communication signal by the access point 620. However, in case that there is a factor that delays wireless communication (e.g., a factor that wireless communication between a wireless communication UE and an access point according to embodiments of the present disclosure is not smooth), the data transmission available time of the access point 620 may be a time calculated by subtracting a specific delay time from the second duration information. In this case, the data transmission available time of the access point 620 may be referred to as 'Notification of Awake State (NAS) duration time', and a section corresponding to the data transmission available time of the access point 620 may be referred to as 'NAS duration section'. Namely, the access point 620 may perform Wi-Fi based wireless communication with the wireless communication UE 600 in the NAS duration section. During this section, the wireless communication UE 600 may be referred to as 'awaken state'. If the wireless communication UE is not in the awaken state, it may be referred to as 'sleep state'.

The access point control unit 622a may control the transmitting unit 623 to transmit data to the wireless communication UE 600 for the data transmission available time. The transmitting unit 623 may demodulate data to be transmitted into a Wi-Fi based wireless communication signal and then transmit it [602a]. The data to be transmitted may include data generated from the access point control unit 622a and transmitted to the transmitting unit 623 or data stored in the buffer memory 622b. Particularly, if the wireless communication UE 600 is not in an awaken state, the access point 620 may save the data, which is to be transmitted, to the buffer memory 622b. If the wireless communication UE 600 enters the awaken state, the access point 620 may transmit the data saved to the buffer memory 622b.

When the wireless communication UE 600 according to embodiments of the present disclosure is in the awaken state, it may receive the data transmitted from the access point [620a]. When the wireless communication UE 600 is in the awaken state, the receiving unit 601 may receive a wireless communication signal transmitted from the access point 620 and the transmitting unit 603 may transmit a wireless communication signal to the access point 620.

The wireless communication UE 600 according to embodiments of the present disclosure may repeatedly perform the first and second steps to perform the Bluetooth based wireless communication with the Bluetooth device 610 or the Wi-Fi based wireless communication with the access point 620. Namely, by signaling the Bluetooth wireless communication section and the Wi-Fi wireless communication section using the first duration information and the second duration information, it is able to provide an effect that the Bluetooth wireless communication and the Wi-Fi wireless communication can coexist.

Figure 7:
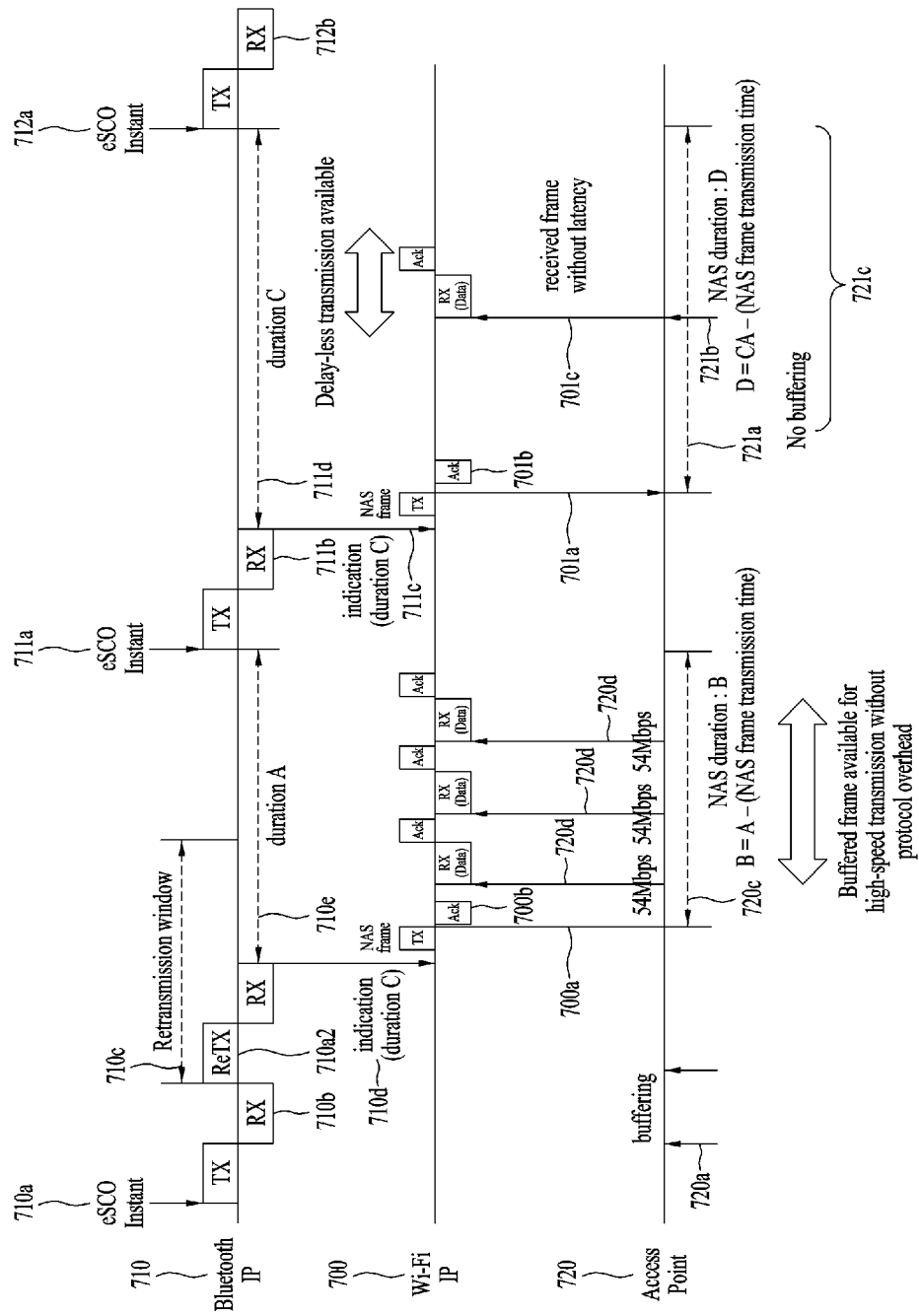
FIG. 7 is a flowchart showing an example for a wireless communication UE 700 according to embodiments of the present disclosure to transceive wireless communication signals with a Bluetooth device 710 and an access point 720 according to embodiments of the present disclosure.

FIG. 7 is a flowchart showing an example for a wireless communication UE 700 according to embodiments of the present disclosure to transceive wireless communication signals with a Bluetooth device 710 and an access point 720 according to embodiments of the present disclosure.

A wireless communication UE 700, a Bluetooth device 710 and an access point 720 according to embodiments of the present disclosure described in the present drawing may correspond to the wireless communication UE 400, the Bluetooth device 410 and the access point 420 described with reference to FIG. 4. In addition, a wireless communication UE 600, a Bluetooth device 610 and an access point 620 according to embodiments of the present disclosure described in the present drawing may correspond to the wireless communication UE 200, the Bluetooth device 210 and the access point 220 described with reference to FIG. 2.

The Bluetooth device 710 and the wireless communication UE 700 according to embodiments of the present disclosure may create a periodic Tx/Rx channel and exchange data with each other [710a, 710b]. If the data transmitted from the Bluetooth device 710 is not transmitted to the wireless communication UE 700, the Bluetooth device 710 may retransmit the data failing to be transmitted [710a2]. In this case, a time available for retransmitting the data failing in transmission may be referred to as a retransmission window [710c]. Namely, the Bluetooth device 710 according to embodiments of the present disclosure may perform wireless communication with the wireless communication UE 700 using a periodic Tx/Rx channel in a Bluetooth wireless communication available section [710a, 710b, 710a2].

The Bluetooth device 710 according to embodiments of the present disclosure may generate a first signal frame containing a first duration information described above and transmit a first wireless communication signal generated from demodulating the first signal frame to the wireless communication UE 700 according to embodiments of the present disclosure [710d]. As described above, the Bluetooth device 710 according to embodiments of the present disclosure may not perform wireless communication with the wireless communication UE 700 according to embodiments of the present disclosure for a time corresponding to the first duration information since a time of transmitting the first wireless communication signal [710e].

The wireless communication UE 700 according to embodiments of the present disclosure may receive the first wireless communication signal transmitted by the Bluetooth device 710. The wireless communication UE 700 according to embodiments of the present disclosure may parse the first signal frame contained in the first wireless communication signal and obtain the first duration information contained in the first signal frame. The wireless communication UE 700 may generate a second duration information using the first duration information and then generate a NAS frame. The wireless communication UE 700 may transmit the generated NAS frame to the access point 720 according to embodiments of the present disclosure [700a]. A structure of the NAS frame will be described in detail with reference to FIG. 8.

A method for generating a second duration information by the wireless communication UE 700 according to embodiments of the present disclosure is described in detail as follows. The second duration information may be generated by an information processing unit of the receiving wireless communication UE and obtained by subtracting a frame transmission time from the first duration information.

Here, the frame transmission time may be indicated as a first delay time, a second delay time or a sum of the first and second delay times. The first delay time may be the time taken from a time of transmitting the first wireless communication signal by the Bluetooth device to a time of receiving the first wireless communication signal by the wireless communication UE. The second delay time may be the time taken from a time of transmitting the second wireless communication signal by the wireless communication UE to a time of receiving the second wireless communication signal by the access point.

The access point 720 according to embodiments of the present disclosure may receive the second wireless communication signal transmitted by the wireless communication UE according to embodiments of the present disclosure [700a]. After receiving the second wireless communication signal, the access point 720 may transmit an acknowledgement message to the wireless communication UE 700 [700b]. The access point 720 according to embodiments of the present disclosure may receive the second wireless communication signal and then parse a NAS frame by demodulating the second wireless communication signal. After parsing the NAS frame, the access point 720 may obtain the second duration information contained in the NAS frame.

As described above, the access point 720 may calculate a NAS duration time using the second duration information [720c]. Until the formerly calculated NAS duration time expires since a time of receiving the second wireless communication signal [720c], the access point 720 may transmit data to the wireless communication UE 700 according to embodiments of the present disclosure.

A method of calculating the NAS duration time by the access point 700 according to embodiments of the present disclosure will be described in detail. The NAS duration time may be generated by the information processing unit of the access point 720 having received the second wireless communication signal and obtained by subtracting an additional delay time from the second duration information.

Here, the additional delay time may include one of the first delay time, the second delay time or the sum of the first and second delay times, which are described above. If the received second duration information is the information obtained from subtracting the first delay time from the first duration information, the information processing unit of the access point 720 may calculate the NAS duration time by further subtracting the second delay time from the second duration information. If the received second duration information is the information obtained from subtracting the time information of adding up the first and second delay times from the first duration information, the information processing unit may calculate the NAS duration time as equal to the second duration information. The additional delay time may be non-limited by the first delay time, the second delay time or the sum of the first and second delay times.

A method of transmitting data to the wireless communication UE 700 by the access point 720 according to embodiments of the present disclosure will be described in detail. In case that data to be transmitted from the access point 720 to the wireless communication UE 700 is generated ahead of a duration section 720c, the access point 720 saves the data to the buffer memory included in the access point 720 [720a]. Namely, in case that the wireless communication UE 700 is in a sleep state, the data can be saved to the buffer memory included in the access point 720. Likewise, the wireless communication UE 700 according to embodiments of the present disclosure may transmit the data to the access point 720 in a Wi-Fi wireless communication available section.

The access point 720 transmits the data stored in the buffer memory in a NAS duration section. Namely, the access point may transmit the data stored in the memory when the wireless communication UE 700 is in an awaken state. In this case, if a size of the data to be transmitted is greater than that of data transmittable in the NAS duration section, the access point 720 may not transmit the corresponding data.

In case that data to be transmitted from the access point 720 to the wireless communication UE 700 is generated in a duration section 721a, the access point 720 may transmit the data to be transmitted without saving the data to the buffer memory included in the access point 720 [721c]. Namely, in case that the wireless communication UE 700 is in the awaken state, the data may be saved to the buffer memory included in the access point 720. On the other hand, if a size of the data to be transmitted is greater than that of data transmittable in a transmittable section included in a NAS duration section, the access point 720 may not transmit the corresponding data. The transmittable section included in the NAS duration section means a section 721c corresponding to a time after generation of the data to be transmitted in the NAS duration section 721a.

If the time corresponding to the first duration time expires since the time of transmitting the first wireless communication signal, the Bluetooth device 710 according to embodiments of the present disclosure may perform the wireless communication with the wireless communication UE 700 again through the periodic Tx/Rx channel [711a, 711b, 712a, 712b].

The wireless communication UE 700 according to embodiments of the present disclosure may provide an effect of data loss prevention and an effect of improving a Wi-Fi transmission speed via the above-described operations. The wireless communication UE 700 according to embodiments of the present disclosure prevents the packet drop effect of the Wi-Fi wireless communication, which may occur in the course of performing wireless communication with the Bluetooth device 710, whereby the data loss problem can be solved. In addition, the packet drop of the Wi-Fi wireless communication is prevented, whereby a reduced speed problem of wireless communication in the link adaptation algorithm can be solved. Namely, owing to the above operations, the access point 720 and the wireless communication UE 700 may perform continuous transmission/reception of wireless communication signals without unnecessary protocol overhead. Therefore, high-speed transmission of wireless communication is enabled from the above-described operation, and an effect of maximizing the utilization of the wireless communication transmission available section can be provided.

Figure 8:
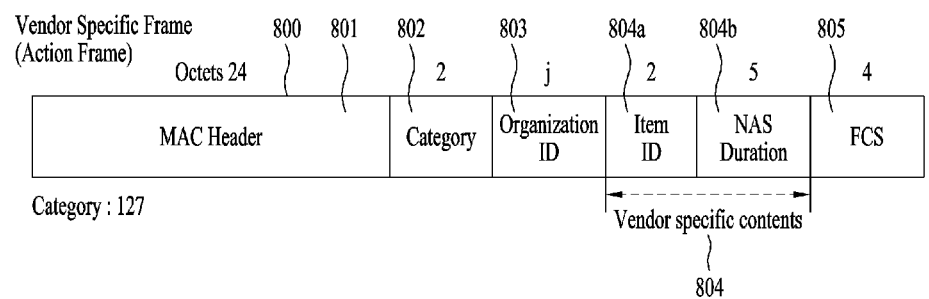
FIG. 8 shows a vendor specific action frame in an action frame according to IEEE 802.11 Standard as one example of a structure of a NAS frame according to embodiments of the present disclosure.

FIG. 8 shows a vendor specific action frame in an action frame according to IEEE 802.11 Standard as one example of a structure of a NAS frame according to embodiments of the present disclosure.

As one example of a NAS frame 800 according to embodiments of the present disclosure, there may be a vendor specific action frame of IEEE 802.11 Standard. The vendor specific action frame may include a MAC header information 801, a category information 802 indicating a type of a signal frame, an organization ID information 803, a vendor specific contents information 804, and a Frame Check Sequence (FCS) information 805 indicating an information for detecting an error in wireless communication transmission/reception. The vendor specific contents information 804 may include an item ID information 804a containing identifier information of a Bluetooth device or a wireless communication UE and a second duration information 804b.

The MAC header information 801 may indicate a control information of a vendor specific action frame including a NAS frame according to embodiments of the present disclosure. The MAC header information may include a frame control, a duration, an address, a selective sequence control information, a selective QoS control information, etc.

The category information 802 may indicate a type of an action frame according to IEEE 802.11 Standard. Particularly, according to IEEE 802.11 Standard, a vendor specific action frame among action frames may have '127' as a value. The organization ID information 803 may be the information indicating a unique identification information of a user, a provider or the like.

The item ID information 804a included in the vendor specific contents information 804 may include an identifier information of a Bluetooth device or a wireless communication UE. In case that a wireless communication UE according to embodiments of the present disclosure performs wireless communication with a plurality of Bluetooth devices, an identifier information of the Bluetooth device or the wireless communication UE may be indicated in a manner of being configured differently for each device. The item ID 804a may have a size of 2 octets more or less. The vendor specific contents information 804 may include a second duration information 804b.

The second duration information is the same as described above. The second duration information may be the time information indicating a time for a wireless communication UE according to embodiments of the present disclosure can perform Wi-Fi based wireless communication with an access point according to embodiments of the present disclosure. The second duration information may be generated by an information processing unit of the receiving wireless communication UE and obtained by subtracting a frame transmission time from the first duration information. Here, the frame transmission time may be indicated as a first delay time, a second delay time or a sum of the first and second delay times. The first delay time may be the time taken from a time of transmitting the first wireless communication signal by the Bluetooth device to a time of receiving the first wireless communication signal by the wireless communication UE. The second delay time may be the time taken from a time of transmitting the second wireless communication signal by the wireless communication UE to a time of receiving the second wireless communication signal by the access point.

A NAS frame according to embodiments of the present disclosure may be a vendor specific action frame according to IEEE 802.11 Standard. The NAS frame according to embodiments of the present disclosure is non-limited by IEEE 802.11 Standard, and may follow other wireless communication standards or correspond to a frame structure according to a data communication protocol.

A wireless communication UE according to embodiments of the present disclosure may perform wireless communication without changing the IEEE 802.11 Standard specifications, thereby preventing malfunction in a wireless communication transceiving system failing to support a wireless communication transceiving system according to the present disclosure.

Figure 9:
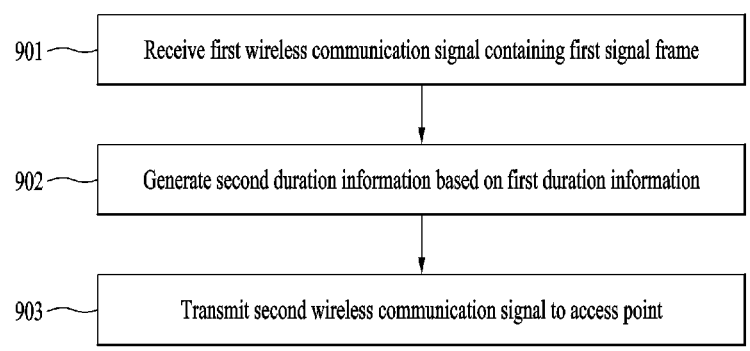
FIG. 9 shows a process for receiving a first wireless communication signal and transmitting a second wireless communication signal to transceive wireless communication signals with a Bluetooth device and an access point according to embodiments of the present disclosure.

FIG. 9 shows a process for receiving a first wireless communication signal and transmitting a second wireless communication signal to transceive wireless communication signals with a Bluetooth device and an access point according to embodiments of the present disclosure.

First of all, a wireless communication UE according to embodiments of the present disclosure may receive a first wireless communication signal containing a first signal frame [901]. The first wireless communication signal may include a wireless communication signal transmitted by a Bluetooth device according to embodiments of the present disclosure. The first signal frame may contain a first duration information. As described above, the first duration information may be the information indicating a time for which the Bluetooth device according to embodiments of the present disclosure fails to perform Bluetooth based wireless communication with the wireless communication UE according to embodiments of the present disclosure.

The wireless communication UE according to embodiments of the present disclosure may generate a second duration information based on the first duration information [902]. The second duration information may be a time information indicating a time for which a wireless communication UE according to embodiments of the present disclosure can perform Wi-Fi based wireless communication with an access point according to embodiments of the present disclosure. Specifically, the second duration information may be generated by an information processing unit of the receiving wireless communication UE and obtained by subtracting a frame transmission time from the first duration information. Here, the frame transmission time may be indicated as a first delay time, a second delay time or a sum of the first and second delay times. The first delay time may be the time taken from a time of transmitting the first wireless communication signal by the Bluetooth device to a time of receiving the first wireless communication signal by the wireless communication UE. The second delay time may be the time taken from a time of transmitting the second wireless communication signal by the wireless communication UE to a time of receiving the second wireless communication signal by the access point.

The wireless communication UE according to embodiments of the present disclosure may transmit the second wireless communication signal to the access point. The second wireless communication signal may contain a second signal frame. The second signal frame may be referred to as a NAS frame and may include a vendor specific action frame according to the IEEE 802.11 wireless communication standard. The wireless communication UE may perform wireless communication with the access point according to embodiments of the present disclosure without performing wireless communication with the Bluetooth device according to embodiments of the present disclosure until the first delay time expires since a time of receiving the first wireless communication signal.

Figure 10:
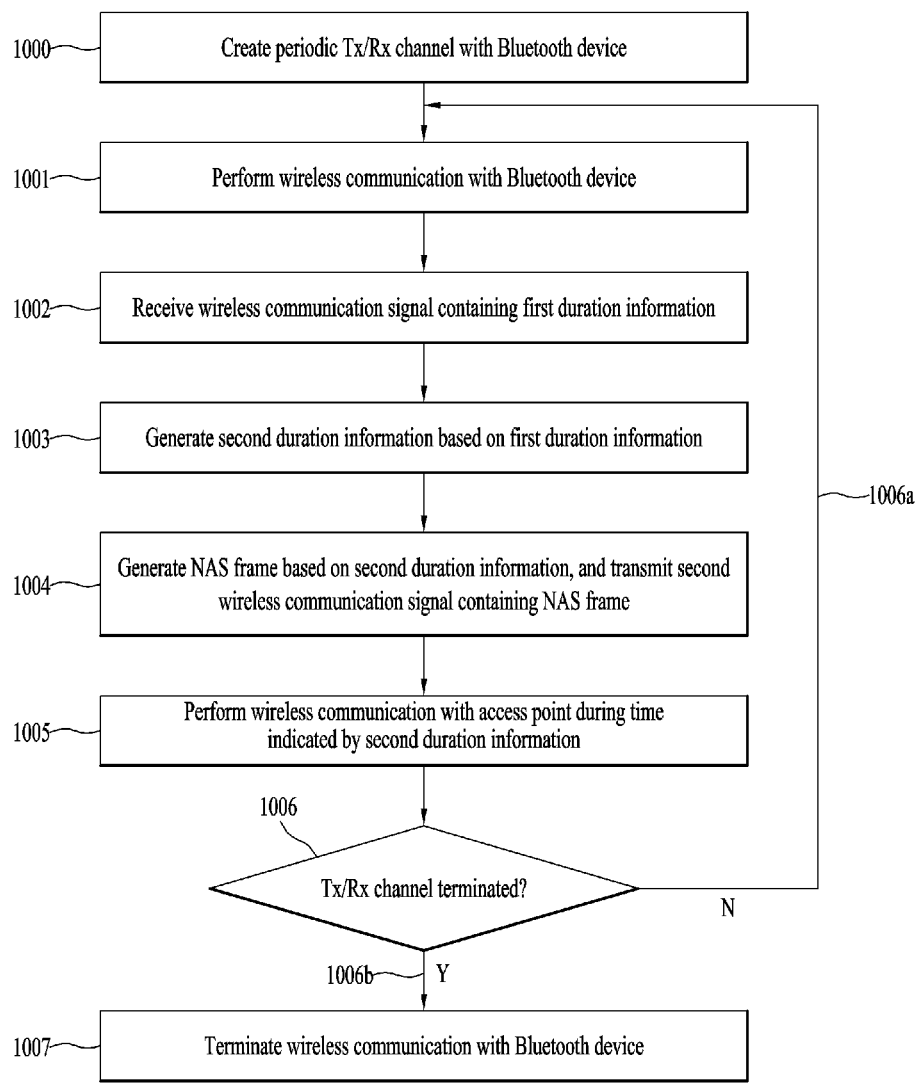
FIG. 10 is a full flowchart showing a method for a wireless communication UE according to embodiments of the present disclosure to transceive wireless communication signals with a Bluetooth device and an access point according to embodiments of the present disclosure.

FIG. 10 is a full flowchart showing a method for a wireless communication UE according to embodiments of the present disclosure to transceive wireless communication signals with a Bluetooth device and an access point according to embodiments of the present disclosure.

First of all, a wireless communication UE according to embodiments of the present disclosure may create a periodic Tx/Rx channel with a Bluetooth device [1000]. A process for creating a periodic Tx/Rx channel by the wireless communication UE and the Bluetooth device according to embodiments of the present disclosure is the same as described with reference to FIG. 5 (a). Once the periodic Tx/Rx channel between the wireless communication UE and the Bluetooth device according to embodiments of the present disclosure is created, the wireless communication UE according to embodiments of the present disclosure may perform wireless communication with the Bluetooth device [1001].

A receiving unit of the wireless communication UE according to embodiments of the present disclosure may receive a first wireless communication signal containing a first duration information from the Bluetooth device [1002]. The receiving unit of the wireless communication UE may obtain a first signal frame by parsing the received first wireless communication signal and then transmit it to an information processing unit included in the wireless communication UE according to embodiments of the present disclosure.

The information processing unit may generate a second duration information based on the first duration information contained in the first signal frame [1003]. A process for generating the second duration information is described with reference to FIG. 6 and FIG. 7.

If the second duration information is generated, the wireless communication UE according to embodiments of the present disclosure may generate a NAS frame based on the second duration information and then transmit a second wireless communication signal containing the NAS frame [1004]. The wireless communication UE according to embodiments of the present disclosure may perform wireless communication with an access point for a time corresponding to the second duration information [1005].

The wireless communication UE according to embodiments of the present disclosure may check whether a periodic Tx/Rx channel between the wireless communication UE and the Bluetooth device is terminated. If the channel is not terminated, the wireless communication UE may perform the wireless communication with the Bluetooth device again [1001] and repeat it until the periodic Tx/Rx channel is terminated [1006a]. If the periodic Tx/Rx channel between the wireless communication UE and the Bluetooth device is terminated, the wireless communication UE may terminate the wireless communication with the Bluetooth device.

It will be understood by those skilled in the art that various modifications and variations can be made in the present disclosure without departing from the spirit or scope of this invention. Thus, it is intended that the present disclosure covers the modifications and variations of this invention provided they come within the scope of the appended claims and their equivalents.

Both apparatus and method inventions are mentioned in this specification, and descriptions of both apparatus and method inventions are applicable in a manner of supplementing each other.

A module, unit, or block according to embodiments of the present disclosure may be a processor/hardware/software that executes a series of performance processes stored in a memory (or storage unit). Each step or method in the aforementioned embodiment can be performed by hardware/processor/software. In addition, the methods presented by the present disclosure can be implemented as code. This code can be written on a processor-readable storage medium and read by the processor provided by the apparatus according to the embodiments of the present disclosure.

Mode for Disclosure

Various embodiments are described in BEST MODE FOR DISCLOSURE to implement the present disclosure.

INDUSTRIAL APPLICABILITY

It will be apparent to those skilled in the art that various modifications and variations can be made in the present disclosure without departing from the spirit or scope of this invention. Thus, it is intended that the present disclosure covers the modifications and variations of this invention provided they come within the scope of the appended claims and their equivalents.

What is claimed is:

1. A wireless communication user equipment, comprising:
a receiving unit receiving a first wireless communication signal containing a first signal frame, the first wireless communication signal comprising a wireless communication signal transmitted by a Bluetooth device, the first signal frame containing a first duration information;
an information processing unit generating a second duration information based on the first duration information; and
a transmitting unit transmitting a second wireless communication signal to an access point,
wherein the second wireless communication signal contains a second signal frame,
wherein the second signal frame contains the second duration information
wherein the access point transmits transmission data to the wireless communication user equipment in a Notification of Awake State (NAS) duration section in response to the second signal frame received from the wireless communication user equipment, and
wherein the NAS duration section comprises a section amounting to a time corresponding to the second duration information since a time of receiving the second signal frame by the access point.

2. The wireless communication user equipment of claim 1, wherein the second duration information is obtained from subtracting a frame transmission time from the first duration information.

3. The wireless communication user equipment of claim 2, wherein the frame transmission time comprises one selected from the group consisting of a first delay time, a second delay time and a sum of the first delay time and the second delay time, wherein the first delay time comprises a time taken from a time of transmitting the first wireless communication signal by the Bluetooth device to a time of receiving the first wireless communication signal by the wireless communication user equipment, and wherein the second delay time comprises a time taken from a time of transmitting the second wireless communication signal by the wireless communication user equipment to a time of receiving the second wireless communication signal by the access point.

4. The wireless communication user equipment of claim 1, wherein the second duration information is transmitted in a manner of being contained in a vendor specific frame contained in the second signal frame.

5. The wireless communication user equipment of claim 1, wherein the transmission data comprises either a data generated within the NAS duration section and transmitted to the wireless communication user equipment or a data transmitted to the wireless communication user equipment after stored in a buffer memory included in the access point by being generated in a section other than the NAS duration section.

6. A method of wireless communication transmission and reception in a wireless communication user equipment, the method comprising:
receiving a first wireless communication signal containing a first signal frame, the first wireless communication signal comprising a wireless communication signal transmitted by a Bluetooth device, the first signal frame containing a first duration information;
generating a second duration information based on the first duration information; and transmitting a second wireless communication signal to an access point, wherein the second wireless communication signal contains a second signal frame, wherein the second signal frame contains the second duration information wherein the access point transmits transmission data to the wireless communication user equipment in a Notification of Awake State (NAS) duration section in response to the second signal frame received from the wireless communication user equipment, and wherein the NAS duration section comprises a section amounting to a time corresponding to the second duration information since a time of receiving the second signal frame by the access point.

7. The method of claim 6, wherein the second duration information is obtained from subtracting a frame transmission time from the first duration information.

8. The method of claim 7, wherein the frame transmission time comprises one selected from the group consisting of a first delay time, a second delay time and a sum of the first delay time and the second delay time, wherein the first delay time comprises a time taken from a time of transmitting the first wireless communication signal by the Bluetooth device to a time of receiving the first wireless communication signal by the wireless communication user equipment, and wherein the second delay time comprises a time taken from a time of transmitting the second wireless communication signal by the wireless communication user equipment to a time of receiving the second wireless communication signal by the access point.

9. The method of claim 6, wherein the second duration information is transmitted in a manner of being contained in a vendor specific frame contained in the second signal frame.

10. The method of claim 6, wherein the transmission data comprises either a data generated within the NAS duration section and transmitted to the wireless communication user equipment or a data transmitted to the wireless communication user equipment after stored in a buffer memory included in the access point by being generated in a section other than the NAS duration section.

* * * * *